United States Patent
Sultenfuss et al.

(10) Patent No.: US 9,069,540 B2
(45) Date of Patent: Jun. 30, 2015

(54) INFORMATION HANDLING SYSTEM ADAPTIVE HIGH PERFORMANCE POWER DELIVERY

(71) Applicant: Dell Products L.P., Round Rock, TX (US)

(72) Inventors: Andrew T. Sultenfuss, Leander, TX (US); Mohammed K. Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 13/633,580

(22) Filed: Oct. 2, 2012

(65) Prior Publication Data

US 2014/0095899 A1    Apr. 3, 2014

(51) Int. Cl.
G06F 1/00      (2006.01)
G06F 1/26      (2006.01)
G06F 1/32      (2006.01)

(52) U.S. Cl.
CPC ............. *G06F 1/266* (2013.01); *Y02B 60/1285* (2013.01); *G06F 1/3296* (2013.01); *G06F 1/26* (2013.01); *G06F 1/3203* (2013.01); *Y02B 60/1217* (2013.01); *G06F 1/00* (2013.01)

(58) Field of Classification Search
CPC ......... G06F 1/266; G06F 1/3203; G06F 1/26; G06F 1/3296; G06F 1/00; Y02B 60/1217; Y02B 60/1285
USPC .................................. 713/300, 310, 330, 340
See application file for complete search history.

(56) References Cited

U.S. PATENT DOCUMENTS

| | | | |
|---|---|---|---|
| 7,624,202 B2 | 11/2009 | Monks et al. | |
| 7,694,032 B2* | 4/2010 | Lim et al. | 710/14 |
| 7,698,490 B2 | 4/2010 | Terrell, II | |
| 8,084,987 B2 | 12/2011 | Hurtz | |
| 2010/0052620 A1 | 3/2010 | Wong | |
| 2012/0078690 A1* | 3/2012 | Harriman et al. | 705/14.4 |
| 2012/0210146 A1* | 8/2012 | Lai et al. | 713/310 |

OTHER PUBLICATIONS

Len Sherman, The Basics of USB Battery Charging: A Survival Guide, Dec. 9, 2010, Maxim Integrated Products, Inc. (http://www.maximintegrated.com/en/app-notes/index.mvp/id/4803).*
Brad Saunders, USB 3.0 Promoter Group Announces Availability of USB Power Delivery Specification, Jul. 18, 2012, USB 3.0 Promoter Group (http://www.usb.org/press/USB_Power_Delivery_Spec_Completion_FINAL_072712.pdf).*

* cited by examiner

*Primary Examiner* — Thomas Lee
*Assistant Examiner* — Mohammad A Rahman
(74) *Attorney, Agent, or Firm* — Terrile, Cannatti, Chambers & Holland, LLP; Robert W. Holland

(57) ABSTRACT

An information handling system provides power to a peripheral through a peripheral interface, such as a USB interface, by communicating power availability with a primary set of power parameters through a data link and communicating power availability with a secondary set of power parameters through a power link. If a peripheral device has the capability to draw power at the second power parameters, it does so while monitoring for a fold back of host power that indicates power is not available at the second power parameters.

20 Claims, 2 Drawing Sheets

INFORMATION HANDLING SYSTEM ADAPTIVE HIGH PERFORMANCE POWER DELIVERY

BACKGROUND OF THE INVENTION

1. Field of the Invention

The present invention relates in general to the field of information handling system power management, and more particularly to an information handling system adaptive high performance power delivery.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interface with peripheral devices through cables that couple to ports disposed at the information handling systems. For example, an information handling system often includes a port for interfacing with a display, such as a DisplayPort port, a network, such as an Ethernet Category 5 port, and a storage device, such as a SATA or PCIe port. In some cases, peripherals are designed to interact with information handling systems through non-specialized ports, such as Universal Serial Bus (USB) ports. USB provides a standardized serial link through which external devices can exchange information with an information handling system. For example, keyboards, mice, hard disk drives, displays, cameras, smartphones and other devices can exchange information with information handling systems by coupling a USB cable between standardized USB ports of the device and the information handling system. A USB standard protocol establishes communication with a handshake between the devices so that a wide variety of data types can use a common protocol.

In some situations, power to run peripheral devices is not readily available, such as in a remote location where an information handling system runs on an internal battery. Even where external power is available, interfacing peripherals with both external power and an information handling system is inconvenient to an end user. To provide greater convenience to end users, some information handling system peripheral ports provide power to peripherals. One example of this is USB, which includes a configuration descriptor that specifies power consumption by a peripheral device. A USB device specifies it power consumption in 2 mA units and provides low power bus functions, high power bus functions and self-powered bus functions. Power provided from a USB port can run components of the peripheral or re-charge a battery that runs the components. Low powered bus functions draw all power to run the peripheral device from the bus and are limited to one unit. High powered bus functions draw all their power from the bus and are limited to one unit until configuration is complete, after which they can drain up to five units. Self-powered peripherals draw one unit from the bus and rely on internal power for the remainder of their power consumption.

Portable smartphones are a common peripheral that receive power from information handling systems. When an end user interfaces a portable telephone with an information handling system USB port, the end user can communicate information between the information handling system and portable telephones, such as by downloading pictures, while at the same time re-charging the battery of the portable telephone. USB allows charging of the battery of a smartphone or other peripheral with a standard downstream port (SDP), a charging downstream port (CDP) or a dedicated charging port (DCP). SDP provides a maximum of 500 mA when configured. A peripheral can recognize SDP with hardware by detecting that data lines D+ and D− are separately grounded through 15 kOhms, however, enumeration is still required by the USB specification. CDP supplies up to 1.5 A without enumeration by using a hardware handshake implemented by manipulating the D+ and D− lines before turning the data lines over to the USB transceiver. DCP allows up to 1.5 A of charging without digital communication by detecting a short between D+ and D−. If a peripheral attempts to draw power from a USB port at a rate greater than the port is specified to provide, the port will likely fail, such as by blowing a fuse. However, in some instances, charging a battery with the USB standard current can take a significant amount of time.

SUMMARY OF THE INVENTION

Therefore a need has arisen for a system and method which supports increased power delivery through a peripheral port while preserving legacy power modes.

In accordance with the present invention, a system and method are provided which substantially reduce the disadvantages and problems associated with previous methods and systems for providing power to peripherals through an information handling system peripheral port. A power indication sent through a peripheral power link provides a peripheral device with an opportunity to set legacy power parameters or increased power parameters for drawing power from the information handling system. If the peripheral is not equipped to use increased power parameters, a legacy handshake through data lines sets up power transfer with the legacy power parameters. If the peripheral is equipped to use increased power parameters but not power indicator is detected, legacy power parameters are applied at the peripheral. If a peripheral is equipped to use increased power parameters and a power indicator is detected, the peripheral sets the increased power parameters to draw power from the information handling system.

More specifically, an information handling system processes information with processing components disposed in a housing, such as a processor and memory that cooperate to execute instructions. A peripheral port disposed at the housing couples with a peripheral cable to interface peripheral devices with the information handling system, such as USB port that interfaces with a smart phone, storage device or other type of peripheral. The peripheral cable communicates data over a data link and transfers power over a power link. Power transfers are performed according to one or more legacy power parameters based upon a peripheral configuration performed through the data link. At or before the legacy peripheral power configuration, a high voltage power signal is provided from the information handling system at the power link to the peripheral to indicate the availability of power transferred from the information handling system with secondary power parameters having a greater power transfer rate than the legacy power parameters. If the peripheral device can accept power at the secondary power parameters, power draw is set at the legacy power parameters and increased to test whether power from the information handling system folds back, indicating that the secondary power parameters are not available. If power from the information handling system folds back above the legacy power parameters, then power is transferred with the legacy power parameters. If power does not fold back, then power transfer is drawn by the peripheral from the information handling system with the secondary power parameters.

The present invention provides a number of important technical advantages. One example of an important technical advantage is that increased power delivery is available from an information handling system peripheral port while preserving legacy power delivery modes. For example, power delivery of 20 W through a USB port when selectively applied to approved peripheral devices provides a reduced charging time for the peripheral devices. Signaling increased peripheral port power output by setting host output at a high voltage level before power configuration provides a low cost technique adaptable to a variety of products without significant hardware or software changes at the host and peripheral. The high voltage signal at the power line does not impact the operation of legacy peripheral devices so that increased power transfer rates are selectively engaged at peripheral devices configured to detect the power indication without impacting legacy peripheral device operations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Providing power from an information handling system to a peripheral with a secondary set of power parameters is supported by indicating the availability of power at the second set of parameters through a power link between the information handling system and peripheral. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
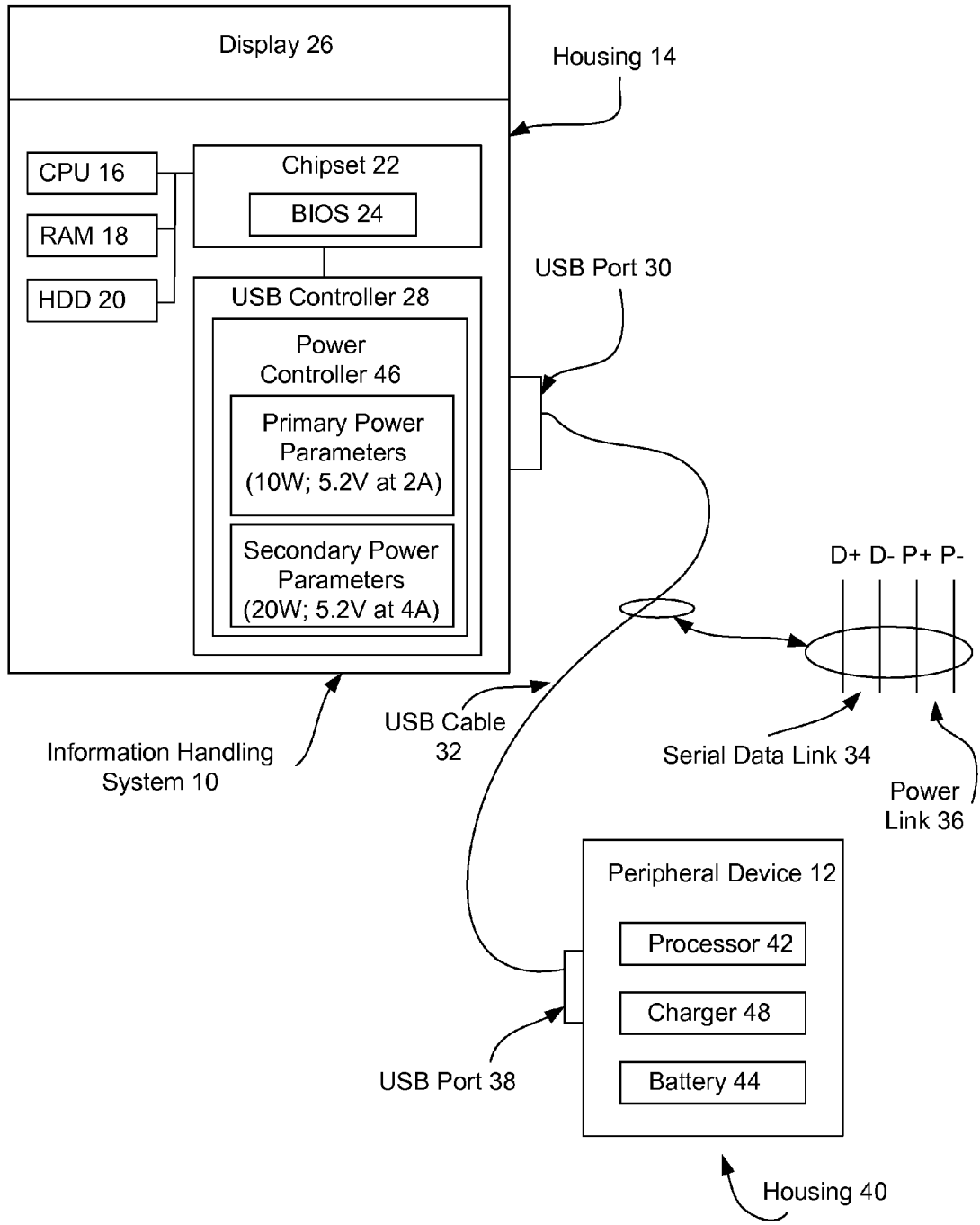
FIG. 1 depicts a block diagram of an information handling system providing power to a peripheral at first or second power parameters.

Referring now to FIG. 1, a block diagram depicts an information handling system 10 providing power to a peripheral 12 at first or second power parameters. Information handling system 10 is, for example, a desktop, laptop, tablet or other type of information handling system that processes information with components disposed in a housing 14. In the example embodiment, a processor 16 processes information by executing instructions stored in memory, such as RAM 18 or a hard disk drive 20. A chipset 22 manages cooperation between the components with firmware executing on processors, such as BIOS firmware. For example, chipset 22 includes graphics logic that presents information stored in RAM 18 as visual images at a display 26. An operating system running on processor 16 supports the execution of applications. For example, a WINDOWS or LINUX operating system stored in hard disk drive 20 boots to processor 16 by logic in BIOS 24 to support execution of word processing and web browsing applications that present information at display 26.

Information handling system 10 communicates with external peripheral devices through one or more standardized protocols, such as the Universal Serial Bus (USB) protocol. In the example embodiment, a USB controller 28 interfaces with a USB port 30 disposed at housing 14 that accepts a USB cable 32. USB cable 32 includes a serial link 34 with data lines D+ and D− and also includes a power link 36 with positive and ground lines. USB controller 28 formats information for communication across USB cable 32 to a USB port 38 disposed at housing 40 of peripheral device 12. Peripheral 12 includes a processor 42 that processes information and, in some embodiments, a power source to power the processor, such as battery 44. For example, peripheral 42 is a smartphone, a camera, a printer, a scanner, a storage device, a keyboard, a mouse, etc. . . . . A power controller 46 of USB controller 28 coordinates with a charger 48 of peripheral 12 to determine the amount of power that power controller 46 provides through power link 36 for powering peripheral 12 and/or charging battery 44. For example, power controller 46 and charger 48 communicate SDP, CDP or DCP power transfers through serial data link 34 as defined by the USB standard. In one example embodiment, coordination of power delivery under the USB standard provides for a maximum or power transfer of a 10 W rate with approximately 5V transferred at 2 A of current. In alternative embodiments, alternative types of peripheral communication links may be used instead of a USB standard link.

In order to provide expedited power transfer rates over that allowed by the USB power parameters, power controller 46 includes an alternative power transfer protocol to establish a set of secondary power parameters for use instead of the primary power parameters communicated in accordance with the USB standard. Before initiating power transfer from information handling system 10 as host to peripheral 12, power controller 46 sends a power signal through power link 36 that indicates the availability of non-standard power transfer rates, such as a 20 W rate with 5V at 4 A of current. For example, upon detecting an interface with peripheral 12 at port 30, power controller 46 sends a high voltage and low current signal, such as approximately a 5V power application with 500 mA or a lower current that will not exceed allowable current for any standard USB device. As charger 48 performs a power handshake with power controller 46 through serial data link 34 to establish a primary set of power parameters in compliance with the USB standard, charger 48 detects the high voltage signal to determine that a secondary set of power parameters is available from power controller 46. After completing the USB standard power handshake, charger 48 draws up to the first power parameters from power controller 46 to run peripheral device 12 and charge battery 44. If charger 48 needs power in addition to that available at the first power parameters, then charger 48 can initiate power transfer using the second power parameters. Charger 48 exceeds the current draw of the first power parameters and monitors the power provided by the power controller 46 to detect a fold back of the power source, meaning that the voltage and or current provided from information handling system 10 drops to or below minimum levels. If power controller 46 is rated to provide power at the second power parameters, then voltage should remain within the range around 5V defined by the USB specification without a drop until the power drawn approaches or exceeds the second power parameters. If charger 48 detects a fold back, power draw is decreased to stay within the primary power parameters. If charger 48 does not detect a fold back, power draw is increased to the limits set by the secondary power parameters.

Providing an indication of the availability of secondary power parameters by sending a power signal through power link 36 allows peripheral 12 to test for the availability of additional power without confirming the secondary power parameters by communication with the host information handling system 10. In one embodiment, the high voltage power signal is sent before power communications are sent through the data lines. In an alternative embodiment, the high voltage power signal is sent through power link 36 during the USB power handshake through data link 34 but before authorization of a power transfer from the host. If a peripheral is interfaced to information handling system 10 that is not equipped to respond to the indication of secondary power parameters, then the power signal is within minimal acceptable constraints and will essentially be ignored by the peripheral. If a peripheral is equipped to draw power at secondary power parameters but does not receive the power signal, then standard USB power transfer is supported. If a peripheral mistakenly senses a power signal indication of secondary power parameters and attempts to draw power at the secondary power parameters, then fall back of the host will indicate that secondary power parameters are not available and the system reverts to primary power parameters.

Figure 2:
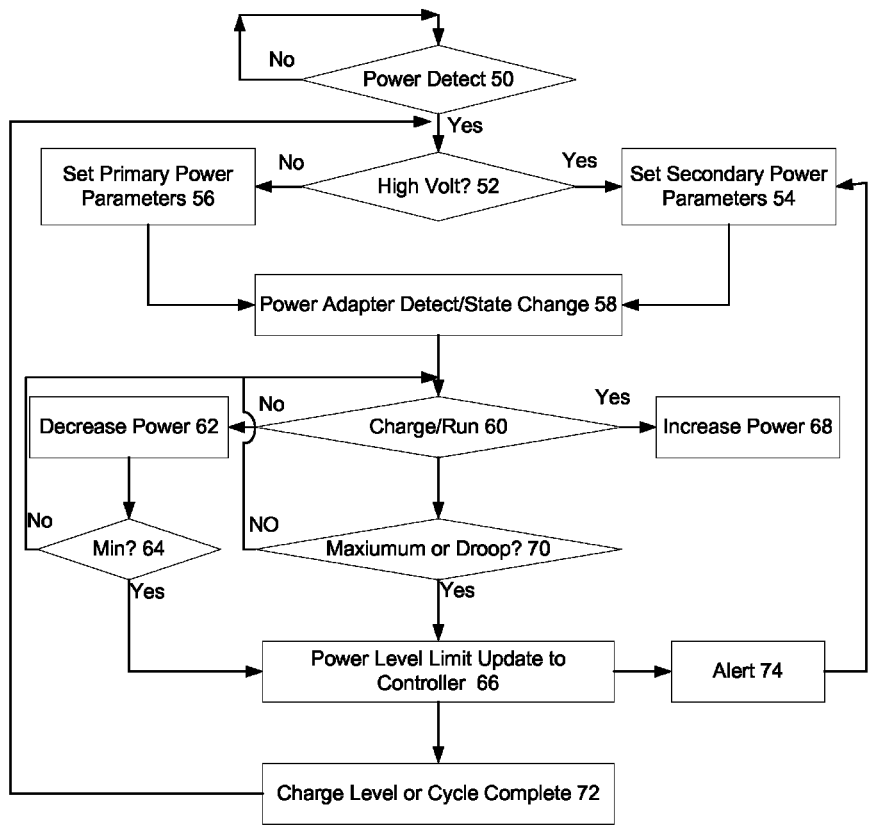
FIG. 2 depicts a flow diagram of a process for providing power from a host information handling system to a peripheral at first and second power parameters.

Referring now to FIG. 2, a flow diagram depicts a process for providing power from a host information handling system to a peripheral at first and second power parameters. The process begins at step 50 with detection of a USB peripheral interfaced to an information handling system USB port. Upon detection of a peripheral interface, the information handling system issues a high voltage power signal through the power link to the peripheral and at step 52 a determination is made at the peripheral device of whether the high voltage power signal is detected. For example, the high voltage power signal is a 5.2V low current signal that will not over stress the peripheral device since a power handshake according to the USB standard is not complete. If the peripheral device detects the power signal, the process continues to step 54 for the peripheral to set power parameters so that a power draw is available from the information handling system at a secondary power level, which is greater than a USB legacy power level. In one embodiment, the secondary power level can depend upon the type of legacy USB power level that is available from the information handling system. For example, if legacy USB power is 5 W, then the secondary power level may be set to 10 W that is less than a maximum value or may be set to a maximum value, such as 20 W. In an alternative embodiment, the secondary power parameters may increase by a predetermined factor over the primary power parameters, such as doubling the rate of power transfer from 10 W to 20 W. In another alternative embodiment, the peripheral device establishes communication with the information handling system to retrieve the secondary power parameters. If at step 52 the peripheral device does not detect the high voltage power signal, the process continues to step 56 to set primary power parameters for use by the peripheral device, such as legacy USB power parameters. At step 58, the process engages power adapter detect logic or power adapter state change logic in accordance with the USB standard so that power is provide from the information handling system according to the primary power parameters if no power signal is detected at step 52 and according to the secondary power parameters if a power signal is detected at step 52.

At step 60, a determination is made of whether to charge or run the peripheral device at an increased power transfer rate or a decreased power transfer rate. If power draw from the peripheral decreases, the process continues to step 62 to decrease the operational level for the power adapter and at step 64 a determination is made of whether a minimum power level is reached. If not, the process returns to step 60 to continue charging or running the peripheral device with power provided by the USB interface. If at step 64, the power has reached a minimum value, the process continues to step 66 to indicate that a power level limit has been reached. If at step 60, power draw to the peripheral device from the information handling system increases, the power operation level is increased at step 68 and the process continues to step 70 to determine if power is at a maximum level. The maximum level is found if the power draw equals the maximum allowed by the first or second power parameters, depending upon which power parameters were set at step 54 or 56. The maximum power level is also determined as reached if power droop, such as a voltage drop, indicates a fold back of power from the host information handling system. For example if secondary power parameters are mistakenly set at the peripheral device for a host information handling system that can only provide power at the first power parameters, then an increase in power draw about the first power parameters will cause a voltage drop from the host information handling system so that a determination of a maximum power draw is made. If a maximum power draw is not found at step 70, the process returns to step 60 to continue charging and/or running the peripheral device with power from the information handling system. At step 66, if the power maximum is found, the process returns to step 54 to confirm whether the secondary power parameters are available. If at step 66 the power minimum is found, the process continues to step 72 to change the power level or indicate that a charge is complete. At step 74, an alert issues if a power maximum or minimum level is reached, such as to initiate power system diagnostics.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to process information;
   memory disposed in the housing and interfaced with the processor, the memory operable to store information;
   a Universal Serial Bus (USB) controller disposed in the housing and interfaced with the processor, the USB controller operable to communicate with a peripheral device through data lines and to provide power to the peripheral device through power lines;
   a USB port disposed at the housing and interfaced with the USB controller, the port operable to accept a USB cable connector to interface the data lines with data lines of a USB cable and to interface the power lines with power lines of the USB cable; and
   a power controller associated with the USB controller, the power controller operable to communicate through the data lines with a peripheral device before completing legacy peripheral power configuration to establish a first power parameters for providing power to the peripheral;
   wherein the power controller is further operable to communicate a power signal through the power lines before completing legacy peripheral power configuration to indicate availability of second power parameters for providing power to the peripheral; and
   wherein the power controller is further operable to confirm whether the second power parameters are available from the host by initiating power transfer with the first power parameters and then increasing power transfer to the second power parameters.

2. The information handling system of claim 1 wherein:
   the second power parameters comprise a greater current than the first power parameters; and
   the power controller is further operable to provide power to the peripheral at up to the greater current.

3. The information handling system of claim 2 wherein the power controller provides power to the peripheral at a current greater than the first power parameters without receiving confirmation of the second power parameters from the peripheral.

4. The information handling system of claim 2 further comprising a peripheral interfaced with the information handling system through a USB cable coupled to the USB port, the peripheral comprising:
   a housing;
   a battery disposed in the housing; and
   a charger disposed in the housing, the charger operable to respond to the power signal by drawing power at a rate greater than the first power parameters without receiving confirmation of the second power parameters from the power controller.

5. The information handling system of claim 4 wherein the charger is further operable to detect a fold back of the power from the USB port in response to the drawing power at a rate greater than the first power parameters, and to use the first power parameters in response to the fold back.

6. The information handling system of claim 1 wherein the power signal is communicated before the power controller communicates through the data lines to establish the first power parameters.

7. The information handling system of claim 6 wherein the peripheral responds to the power signal by drawing power at the first power parameters, increasing power draw to greater than the first power parameters and decreasing power draw to no greater than the first power parameters if power provided from the USB port folds back in response to increasing power draw to greater than the first power parameters.

8. The information handling system of claim 1 wherein the first power parameters comprise 10 W of power and the second power parameters comprise 20 W of power.

9. The information handling system of claim 1 wherein the peripheral comprises a wireless telephone.

10. A method for providing power from a host to a peripheral through a cable, the method comprising:
    detecting an interface between the host and the peripheral through the cable;
    in response to detecting, communicating a power signal from the host to the peripheral through a power line of the cable, the power signal sent before legacy peripheral power configuration of the host and peripheral with digital data communication;
    determining at the peripheral that the power signal indicates the availability of power at a second power parameters;
    signaling between the host and peripheral the availability of power at a first power parameters through a data line of the cable, the signaling of the availability of power at a first power parameters sent before legacy peripheral power configuration of the host and peripheral with digital data communication; and
    confirming at the peripheral whether the second power parameters are available from the host by initiating power transfer with the first power parameters and then increasing power transfer to the second power parameters.

11. The method of claim 10 wherein the communicating a power signal is performed before the signaling between the host and peripheral.

12. The method of claim 11 wherein the second power parameters provide power at a greater rate than the first power parameters.

13. The method of claim 10 further comprising:
    in response to determining at the peripheral from the first power parameters that the second power parameters are available, increasing power draw at the peripheral from the host to a rate above the first power parameters; and
    monitoring at the peripheral the power draw from the host to detect a fold back.

14. The method of claim 13 further comprising:
    detecting a fold back of power from the host; and
    in response to detecting, setting power draw by the peripheral from the host to the first power parameters.

15. The method of claim 13 further comprising:
    detecting a lack of fold back from the host; and
    in response to detecting, setting power draw by the peripheral from the host to the second power parameters.

16. The method of claim 15 wherein the host and peripheral communicate through a USB interface.

17. A host-to-peripheral communication system comprising:
    a serial link having data lines for communicating information;
    a power link having power lines for transferring power from the host to the peripheral;
    a power controller associated with the host and operable to communicate through the serial link the availability of power at a first power parameters before legacy peripheral power configuration of the host and peripheral with digital data communication; and
    a charger associated with the peripheral and operable to communicate through the serial link to receive power at the first power parameters before legacy peripheral power configuration of the host and peripheral with digital data communication;

wherein the power controller is further operable to indicate to the charger the availability of power at a second power parameters by providing a power signal to the power link before legacy peripheral power configuration of the host and peripheral with digital data communication, the second power parameters greater than the first power parameters; and wherein the power controller is further operable to confirm whether the second power parameters are available from the host by initiating power transfer with the first power parameters and then increasing power transfer to the second power parameters.

18. The host-to-peripheral communication system of claim 17 wherein the charger is further operable to detect the power signal and in response to the power signal to draw power at the second power parameters.

19. The host-to-peripheral communication system of claim 18 wherein the charger is further operable to monitor power draw for a fold back and in response to detecting a fold back to limit power draw to the first power parameters.

20. The host-to-peripheral communication system of claim 19 wherein the serial link and power link have a USB interface.

* * * * *